(12) United States Patent
Das et al.

(10) Patent No.: US 6,938,186 B2
(45) Date of Patent: Aug. 30, 2005

(54) SYSTEM AND METHOD FOR PERFORMING A PATH-SENSITIVE VERIFICATION ON A PROGRAM

(75) Inventors: Manuvir Das, Kirkland, WA (US); Mark C. Seigle, Seattle, WA (US); Sorin L. Lerner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 10/157,446

(22) Filed: May 28, 2002

(65) Prior Publication Data

US 2003/0226060 A1 Dec. 4, 2003

(51) Int. Cl.[7] ................................................. G06F 11/30
(52) U.S. Cl. ......................................... 714/38; 717/126
(58) Field of Search ........................... 714/38; 717/124, 717/126, 127, 128, 131, 132, 155

(56) References Cited

U.S. PATENT DOCUMENTS

2003/0204834 A1 * 10/2003 Ball et al. .................... 717/106

OTHER PUBLICATIONS

Ammons, G. Bodik, R. and Larus, J., "Mining Specifications," Conference Record of the Twenty–Ninth ACM Symposium on Principles of Programming Languages, 2002.
Deline, R. and Fahndrich, M., "Enforcing High–Level Protocols in Low–Level Software," Proceedings of the ACM SIGPLAN 2001 Conference on Programming Language Design and Implementation, 2001.
Detlefs, D., Leino, R., Nelson, G., and Saxe, J., "Extended Static Checking," Technical Report TRSRC, Compaq SRC, Dec. 18, 1998, pp. 0–44.

Engler, D., Chen, D.Y., Hallem, S., Chou, A., and Chelf, B., "Bugs as Deviant Behavior: A General Approach to Inferring Errors in Systems Code," Proceedings of the Eighteenth ACM Symposium on Operating Systems Principals, 2001.
Evans, D., "Static Detection of Dynamic Memory Errors," Proceedings of the ACM SIGPLAN 96 Conference on Programming Language Design and Implementation, 1996, pp. 44–53.
Flanagan, C. and Leino, R., "Houdini, an Annotation Assistant for ESC/Java," Symposium of Formal Methods Europe, Mar. 2001, pp. 1–18.
Kuncak, V., Lam, P., Rinard, M., "Role Analysis," Conference Record of the Twenty–Ninth ACM Symposium on Principles of Programming Languages, 2002, pp. 17–32.
Reps, T., Horwitz, S., and Sagiv, M., "Precise Interprocedural Dataflow analysis via Graph Reachability," Conference Record of the Twenty–Second ACM Symposium on Principles of Programming Languages, 1995, pp. 49–61.

(Continued)

*Primary Examiner*—Scott Baderman
(74) *Attorney, Agent, or Firm*—Lee & Hayes, PLLC

(57) ABSTRACT

Described is a method and system that performs path-sensitive verification on programs having any code base size. The method maintains a symbolic store that includes symbolic states. Each symbolic state includes a concrete state and an abstract state. The abstract state identifies a state in which the property being tested currently exists. The concrete state identifies other properties of the program. The symbolic store is updated at each node in a logic path of the program with changes in the abstract state and the concrete state. The updates occur such that the symbolic states associated with a particular edge of any node will not have identical abstract states. Rather, in this case, the symbolic states are merged by combining the concrete states to include content that is similar in both symbolic states. In addition, the concrete state determines relevant paths to proceed along in the logic path.

23 Claims, 11 Drawing Sheets

OTHER PUBLICATIONS

Strom, R., and Yemini, S., "Typestate: A Programming Language Concept for Enhancing Software Reliability," IEEE Transactions on Software Engineering, 1986, vol. 12, Issue 1, 157–171.

Ammons, G. and Larus, J., "Improving Data–flow Analysis with Path Profiles," Proceedings of the ACM SIGPLAN 98 Conference on Programming Language Design and Implementation, 1998, pp. 568–582.

Bodik, R., and Anik, S., "Path–Sensitive Value–Flow Analysis," Symposium on Principles of Programming Languages, pp. 1–15, 1998.

Ball, T., and Rajamani, S., "Automatically Validating Temporal Safety Properties of Interfaces," Proceedings of SPIN '01, 8th Annual SPIN Workshop on Model Checking of Software, May 2001.

Bush, W., Pincus, J., and Sielaff, D., "A Static Analyzer for Finding Dynamic Programming Errors," Software –Practice and Experience, 2000, 775–802, vol. 30, Issue 7.

* cited by examiner

SYSTEM AND METHOD FOR PERFORMING A PATH-SENSITIVE VERIFICATION ON A PROGRAM

BACKGROUND OF THE INVENTION

Today, some software programs contain one million lines of code (LOC) or more. In order to ensure the reliability of these software programs, the software programs undergo testing before releasing the software programs to consumers. A first phase of testing is commonly referred to as verification testing. Verification testing attempts to find errors in the source code of the program. The identified errors may then be corrected before the software program undergoes another phase of testing, commonly referred to as run-time, or beta testing.

One approach for performing verification testing of software programs is based on dataflow analysis. In dataflow analysis, a property that is being tested is analyzed through each path of the program. The analysis determines a state for the property at each point in the program and maintains information regarding the state of the property. Upon traversing two paths of a branch statement, the analysis may determine that the property could be in multiple states at the end of the branch statement. These multiple states are combined and carried forward in the analysis. Later, when another branch statement occurs, the analysis traverses both paths of the branch statement using the combined multiple states. This method of analysis is extremely efficient. However, the results are not very accurate. Typically, the results indicate an error in the source code even when the source code does not have errors. A programmer is then responsible for reviewing the source code and for determining which reported errors are actual errors. Even though dataflow analysis provides inaccurate results, it is commonly performed on both small and large software programs.

Another approach for performing verification testing of software programs is commonly referred to as path-sensitive analysis. Briefly, path-sensitive analysis tracks a concrete state of the program (e.g., values of variables). Therefore, when a branch statement occurs in the program, path-sensitive analysis uses the concrete state to determine which paths of the branch statement are feasible. The feasible paths are then traversed. Whenever the analysis cannot determine which path of the branch statement to traverse based on the concrete state, the analysis duplicates the concrete state so that both paths may modify their copy of the concrete state as needed. This duplication of the concrete state at each branch statement greatly increases the search space and is commonly referred to as "search space explosion". For example, if a program has one hundred (100) branches, the search space may grow exponentially by $2^{100}$. This exponential growth of the search space limits path-sensitive analysis to small software programs.

Until the present invention, full-scale reliable verification of a software program having a large code base was unattainable.

SUMMARY OF THE INVENTION

In accordance with the present invention, a system and method for performing path-sensitive verification on a program is provided. The present invention utilizes concepts from dataflow analysis and traditional path-sensitive verification, and includes a unique add heuristic that provides accurate results 224 without experiencing exponential search space explosion. The method maintains a symbolic store that includes several symbolic states. Each symbolic state includes a concrete state and an abstract state. The abstract state identifies a state in which the property being tested currently exists. The concrete state identifies other properties of the program. The symbolic store is updated at each node in a logic path of the program with changes in the abstract state and the concrete state. The updates occur such that the symbolic states associated with a particular edge of any node will not have identical abstract states. Rather, in this case, the symbolic states are merged by combining the concrete states to include content that are similar in both symbolic states. Thus, decreasing the search space. In addition, the concrete state is used to determine which relevant paths to proceed in the logic path, further decreasing the search space.

In one aspect of the invention, a variable and an associated value are added to the concrete state. The variable and the associated value determine whether a decision path is relevant. If the decision path is not relevant, the decision path is not traversed using a current symbolic state. In a further refinement, the decision statement may be a branch statement having two decision paths.

DETAILED DESCRIPTION OF THE PREFERRED EMBODIMENT

Briefly stated, the present invention verifies the accuracy of source code written for a software program. In accordance with the present invention, a path-sensitive verification process is provided. The path-sensitive verification process maintains a concrete state of the program and an abstract state of the program. Based on the concrete state, the method determines which paths of a branch statement are relevant paths. Upon reaching a join point associated with the traversed relevant paths, the concrete states resulting from each relevant path are combined based on a comparison of the abstract state. The combining performed in accordance with the present invention allows the present invention to scale to software programs with a large code base without experiencing exponential growth in the search space. As will become apparent after reading the detailed description below, the verification process of the present invention provides accurate results for software programs having any size code base (e.g., a million LOCs).

Illustrative Operating Environment

Figure 1:
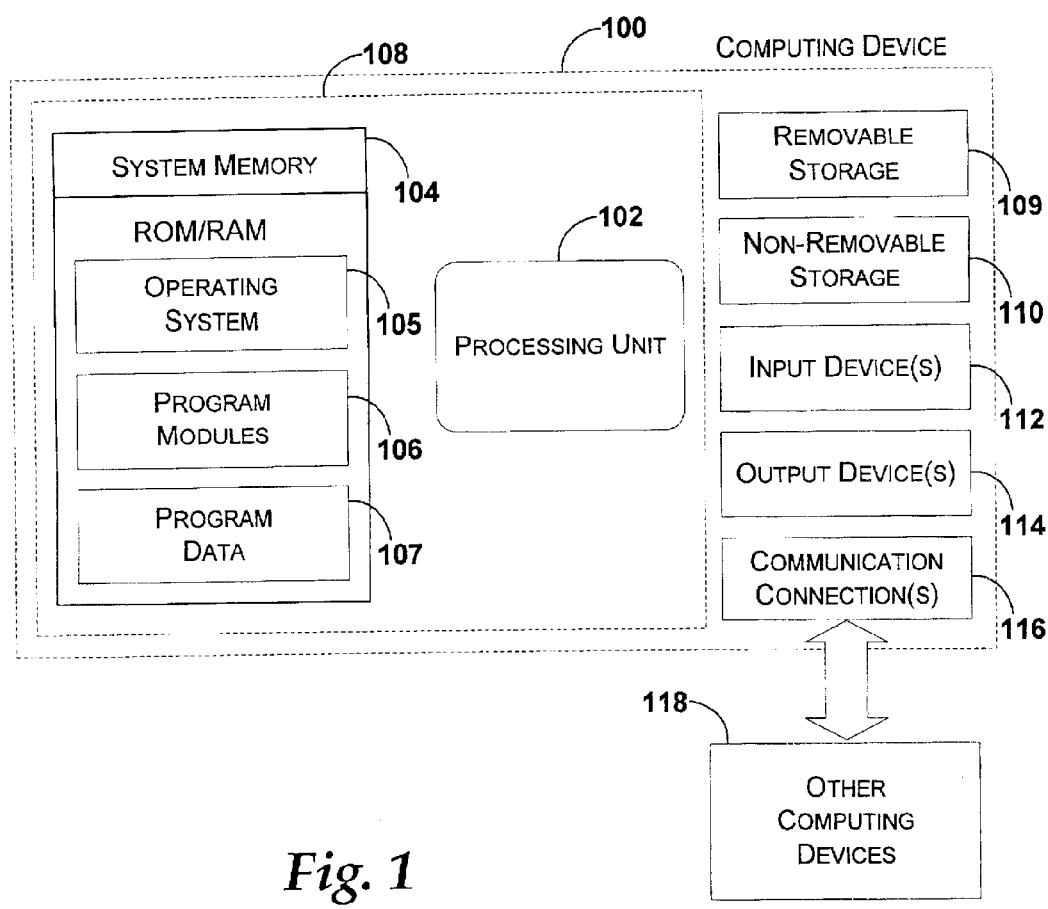
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Verification Testing Environment

Figure 2:
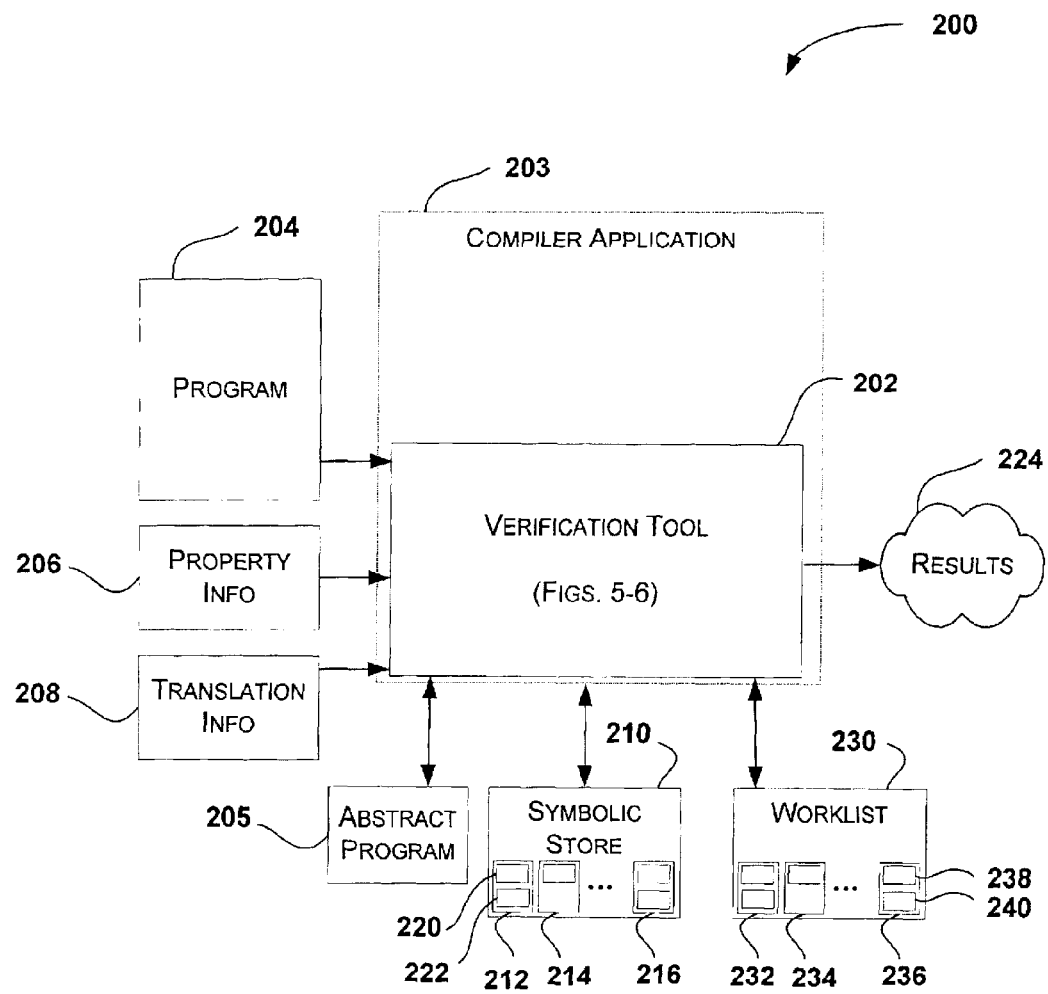
FIG. 2 is a block diagram illustrating an exemplary environment for practicing the present invention.

FIG. 2 is a block diagram illustrating an exemplary environment for practicing the present invention. The exemplary environment shown in FIG. 2 is a verification-testing environment 200. The goal in this verification-testing environment 200 is to verify that program 204 (i.e., source code) will operate properly in any reachable state. The verification-testing environment 200 includes a verification tool 202. The verification tool 202 may operate as a stand-alone tool (i.e., a program module 106 in FIG. 1) or may operate within another tool, such as compiler application 203, shown as a dashed box around the verification tool 202. Program 204 may be written using any programming language, such as "C" programming language and the like.

In this verification-testing environment 200, the verification tool 202 receives the program 204 and property information 206. The property information 206 identifies properties (not shown) that will be tested. Typically, a code developer responsible for creating the program 204 also creates the property information 206. The property information 206 includes information regarding states in which the property being tested may transition during processing. Although generally described here, one exemplary embodiment for the property information 206 is described in detail later in conjunction with FIG. 3. In addition, the verification tool 202 receives translation information 208. The translation information 208 maps a function name within program 204 to one of the transitions defined within property information 206. The verification tool 202 translates the program 204 into an abstract program 205 using the translation information 208. The verification tool 202 then performs the path-sensitive verification process on the abstract program 205 in accordance with the present invention.

During the path-sensitive verification process, the verification tool 202 maintains a symbolic store 210 and may maintain a worklist 230. The symbolic store 210 and the worklist 230 may reside in RAM, on a hard disk, or on any other type of storage. The symbolic store 210 may include several symbolic states (e.g., symbolic states 212–216). Each symbolic state includes an abstract state (e.g., 220). In addition, each symbolic state may include a concrete state (e.g., concrete state 222) associated with the abstract state. In general, the abstract state 220 identifies the state in which the property being test currently exists and the concrete state 222 identifies information on other properties, such as values of variables. Each symbolic state is associated with some edge in a control flow graph. Similarly, the worklist 230 may include several symbolic states (e.g., symbolic states 232–236) with each having an abstract state (e.g., 238) and a concrete state (e.g. 240). Typically, the symbolic states 232–236 within the worklist 230 are a subset of the symbolic states 212–216 in the symbolic store 210. As will be described in detail below, the verification tool 202 uses the worklist 230 for determining which symbolic states still need to be processed. On the other hand, the symbolic store 210 is used to determine whether a newly created symbolic state must be merged with previously created states. The symbolic store is also used to determine whether any of the symbolic states indicate an error condition, once processing of the abstract program is complete.

The verification tool 202 traverses each relevant path in the abstract program 205. When any statement in the abstract program 205 affects the property being tested, the verification tool 202 updates the symbolic store 210 to accurately reflect the changes. The verification tool 202 outputs results 224 from processing. The results 224 may be incrementally outputted, outputted upon completion of the process, or the like. Briefly, as will be described in detail later in conjunction with FIGS. 4–6 and the related series of control flow graphs (CFGs) shown in FIGS. 7–11, the verification tool 202 performs concepts derived from dataflow analysis and traditional path-sensitive verification, and includes a unique add heuristic that provides accurate results 224 without experiencing exponential search space explosion.

Figure 3:
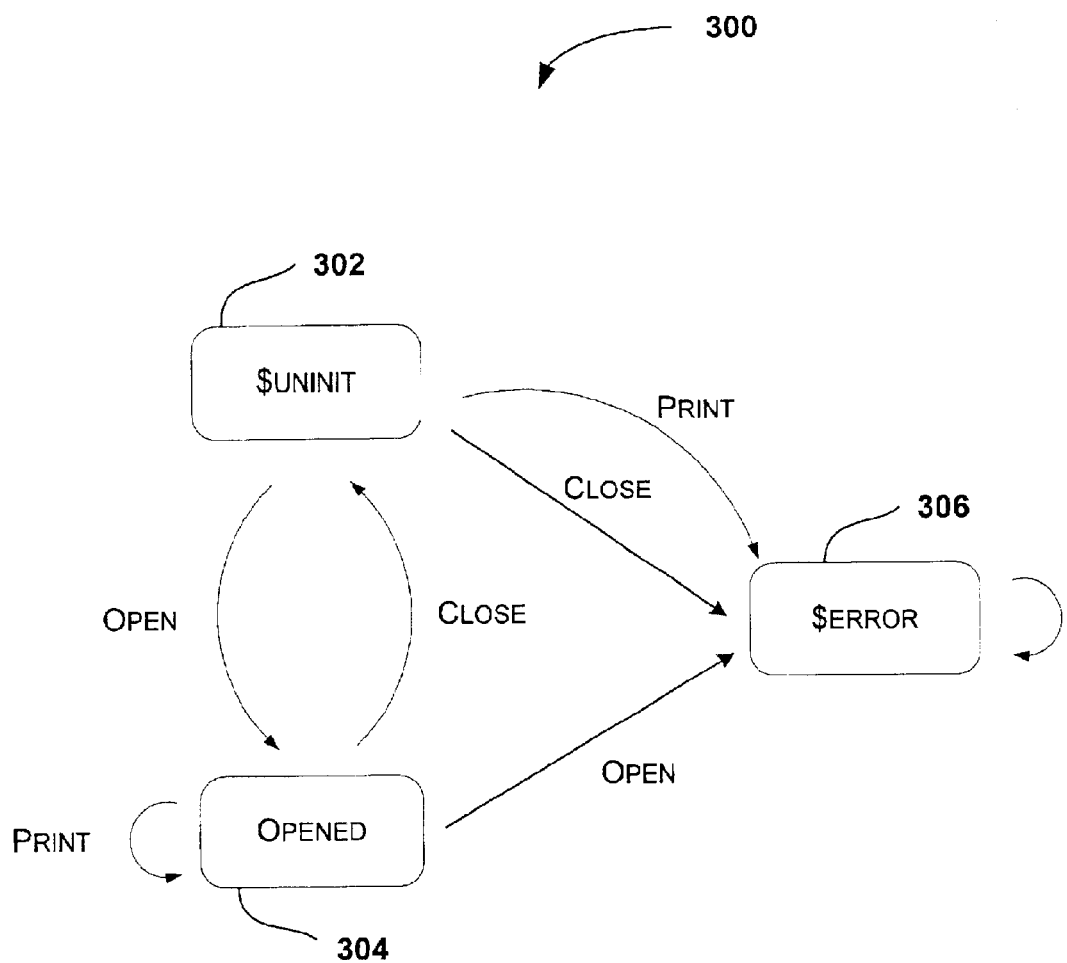
FIG. 3 illustrates an exemplary finite state machine for one property to be tested in accordance with the present invention.

FIG. 3 is a visual representation for the property information 206 of one exemplary property to be tested in accordance with the present invention. The property information for the property being tested is illustrated visually as a finite state machine 300. Typically, there may be several properties that need to be tested in the program 204. Each property being test has its own associated property information. As an example, one property that may be tested is whether all prints to files (hereinafter, referred to as the print-to-file example) are performed on valid, opened files at runtime. The finite state machine 300 graphically illustrates the property information 206 that defines the various states in which the property (e.g., the file) may exist throughout program 204.

Continuing with the print-to-file example, the property (i.e., file) may be in a $uninit state 302, an $error state 306, and an opened state 304. One of the states 302–306 is defined as an initial or default state. For the above example, the $uninit state 302 is the default state. A transition is then defined from each state to each of the other states. Thus, given that the property (i.e., file) is in the $uninit state 302, if the file undergoes an "OPEN" transition, the property (i.e., file) transitions to the opened state 304. When the file undergoes a "CLOSE" transition from the $uninit state 302, the property (i.e., file) transitions to the $error state 306. The determination of which transitions constitute an error is determined by the code developer or any other person responsible for creating the property information 206. For example, a file in the $uninit state 302 that undergoes a "CLOSE" transition may have instead remained in the $uninit state 302. However, once the property information 206 is defined and input into the verification tool 202, the verification tool 202 analyzes the abstract program 205 according to the defined property information 206 until new property information 206 is received.

Continuing with the print-to-file example, the property (i.e., file) transitions to the $uninit state 302 after the file undergoes a "CLOSE" transition from the opened state 304. The property (i.e., file) may also transition to the $opened state 304 after the file undergoes a "PRINT" transition from the opened state 304. The property (i.e., file) transitions to the $error state 306 after the file undergoes an "OPEN" transition from the opened state 304, after the file undergoes "PRINT" transition from the $uninit state 302, and upon any subsequent transition once in the $error state 306.

Thus, in summary, the print-to-file example illustrates a property having three states and three transitions. Using common terminology for state machines, each transition represents an edge. A cyclic edge (e.g., "PRINT" transition when in opened state 304) represents a transition that does not cause a change in state after the transition is completed. Using the finite state machine 300, one can follow the chain of edges between the states to determine the sequence of transitions that the property being tested may undergo during program operation.

Verification Testing Process

Figure 4:
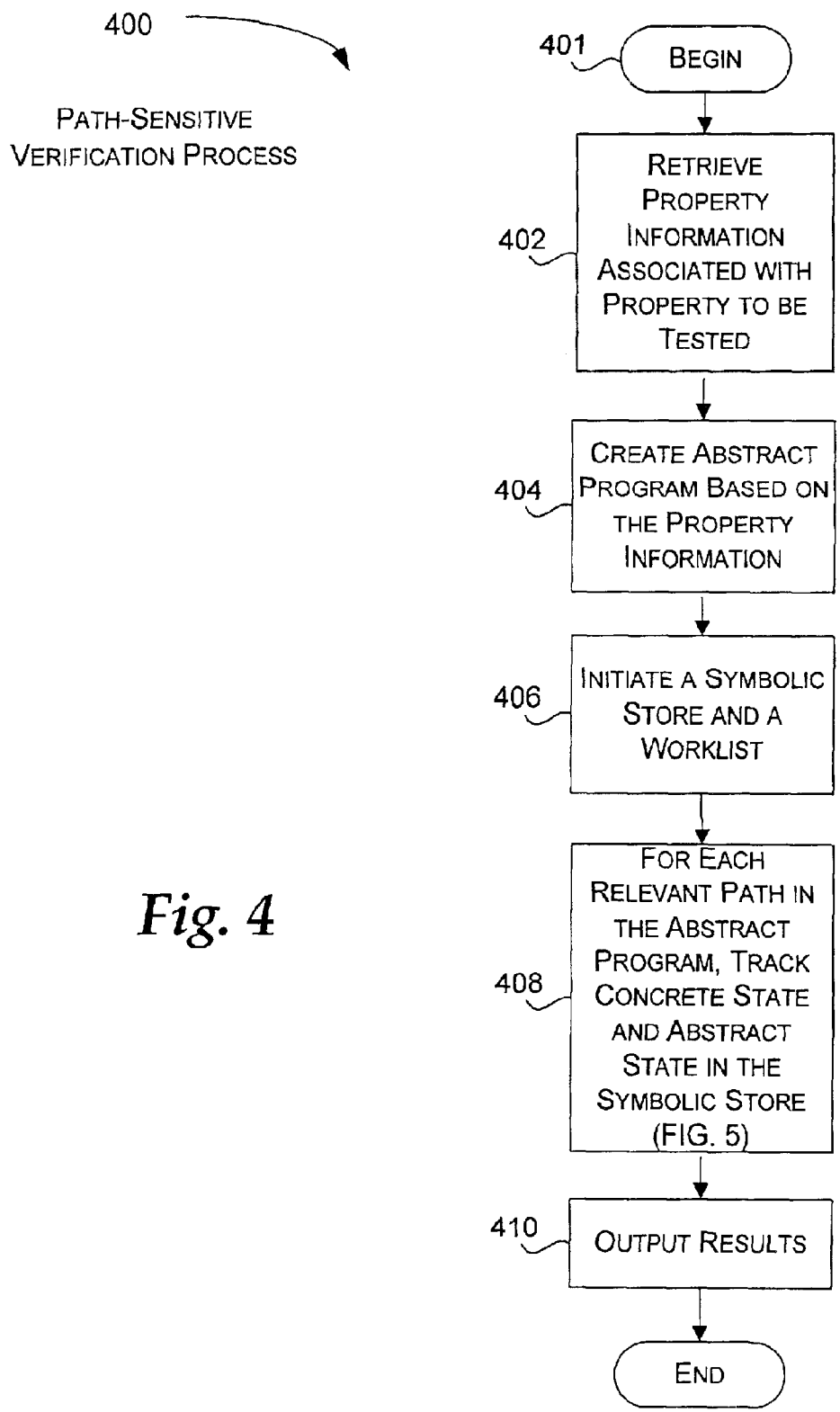
FIG. 4 is a logical flow diagram illustrating an overview of a path-sensitive verification process in accordance with the present invention.

FIG. 4 is a logical flow diagram illustrating an overview of a path-sensitive verification process performed in accordance with the present invention. The process enters at starting block 401, where the verification tool has been initiated in some manner. The process 400 continues at block 402.

At block 402, the property information associated with the property being tested is retrieved. As mentioned above, the property information that is retrieved may include information for several properties. In the following discussion, processing is described for one property. However, the verification testing process may be performed on any number of properties at one time. If more than one property is tested at one time, additional symbolic stores are managed to handle the additional properties being tested. Processing continues at block 404.

At block 404, an abstract program is created based on the property information and on the translation information. When creating the abstract program, each statement in the program is analyzed to determine whether the statement maps to a corresponding transition associated with the property being tested. For example, in the print-to-file example discussed above, whenever a file open statement (e.g., "fopen") occurs in the program, an "OPEN" designation is created in the abstract program to represent the statement. When several instances of the property may be created during the program, the specific instance of the property is maintained along with the designation. For example, in the print-to-file example, each file that may be opened has its own symbolic store. Then, if several instances of the property are tested during the same pass of the abstract program, each individual symbolic store is updated accordingly. In one embodiment of the present invention, each instance of the property being tested is tested separately, such that a separate pass through the abstract program is performed for each instance of the property. Processing continues at block 406.

At block 406, a symbolic store is created and initialized. Typically, creating the symbolic store includes allocating memory and identifying a type of variable or structure. The symbolic store may take any number of forms. One form is a True-False lattice. In the True-False lattice, elements in the symbolic store are maps from variables V in the program to "true" or "false". Another illustrative form is a constant propagation lattice. In the constant propagation lattice, elements in the symbolic store are maps from variables V in the program to "true" or "false", integers, or floating-point values. Those skilled in the art will appreciate that other forms for the symbolic store may be implemented without departing from the scope of the claimed invention. Processing continues at block 408.

At block 408, each relevant path in the abstract program is traversed. During traversal of the relevant path, if the concrete state or the abstract state changes, the symbolic store may be updated to reflect the change. As will be described in detail below in conjunction with FIG. 5, the process uses the symbolic store to determine whether a branch is relevant. As will be described, even when a branch affects the concrete state of the program, the statement may not be relevant to the property being tested. Therefore, the present invention does not traverse non-relevant paths and refrains from unnecessarily doubling the search space upon each branch statement. Processing continues at block 410.

At block 410, results from the verification testing process are output. The output may be in any form, such as a visual representation on a display, a file, or the like. A person responsible for testing the software program may then perform further analysis on the property being tested and correct any errors that are reported for the program. Processing then ends.

Figure 5:
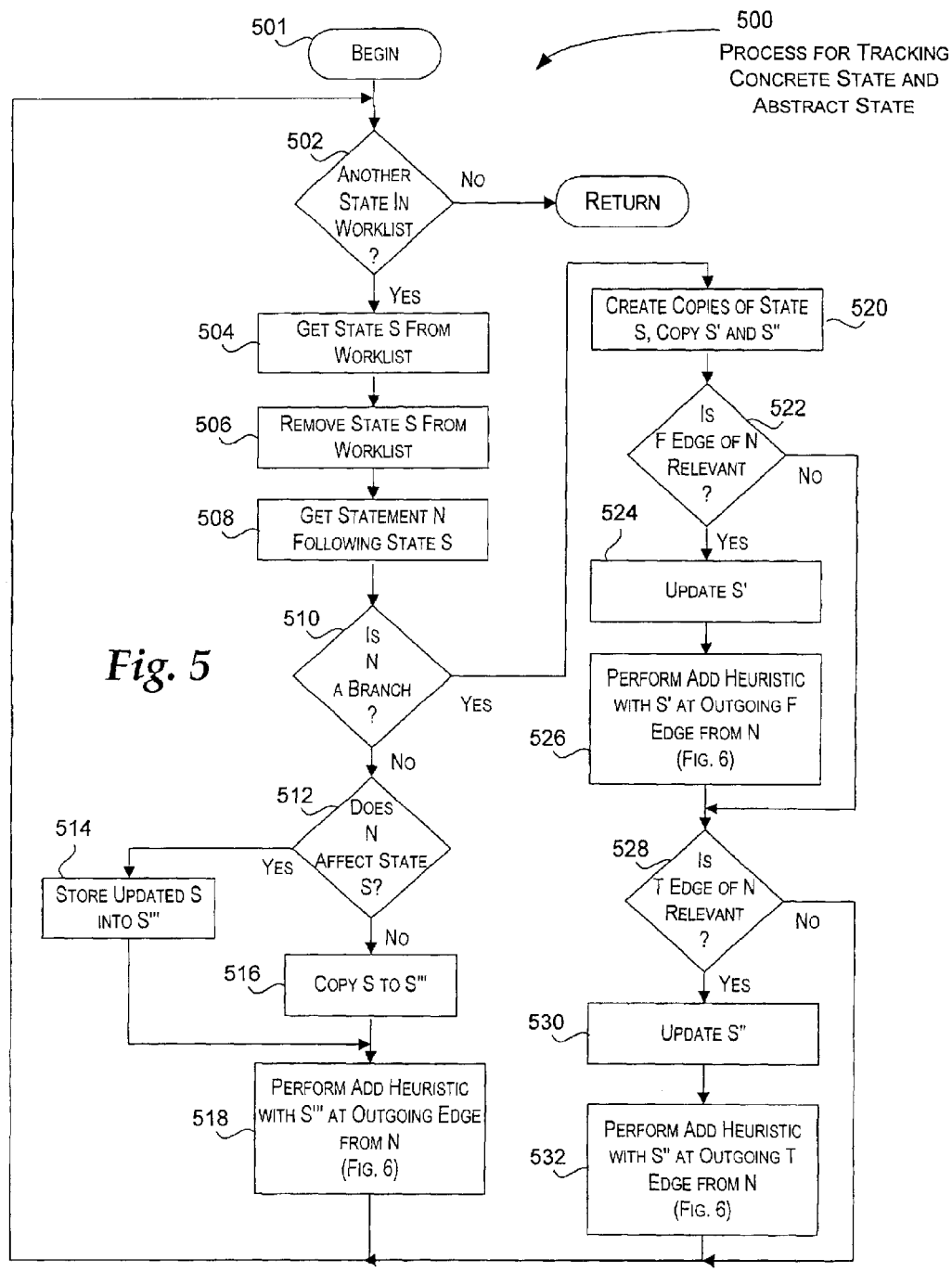
FIG. 5 is a logical flow diagram illustrating a process for tracking the abstract and concrete state in the symbolic store for use in the path-sensitive verification process shown in FIG. 4.

FIG. 5 is a logical flow diagram illustrating a process for tracking the abstract and concrete state for the symbolic store for use in the path-sensitive verification process shown in FIG. 4. First, the flow of process 500 will be described, along with the flow of process 600 shown in FIG. 6. Next, an example will be described in conjunction with logical flow diagrams 500 and 600, along with the control flow graphs illustrated in FIGS. 7–11.

Before describing process 500, terminology that is used throughout the following discussion is defined. First, a symbolic store is a collection of symbolic states that are encountered while processing the abstract program. As will be described in detail below, the present invention reduces the number of symbolic states that are stored in the symbolic store by applying a heuristic that first attempts to combine symbolic states before adding the symbolic states to the symbolic store. Second, a worklist is a current working list of the symbolic states that still need processing.

The process enters at starting block 501, after the verification tool has created an abstract program and has created an empty symbolic store and an empty worklist. For convenience, the following discussion assumes that process 500 is an intraprocedural process having one function (e.g., main( )) in the program and does not have any function calls or returns. The verification tool enters the main( ) program. At this time, the symbolic store contains a single symbolic state that includes the initial or default state associated with the property being tested. The initial state is defined in the property information. At this point, the worklist also contains the initial, default symbolic state. The process 500 continues at decision block 502.

At decision block 502, a determination is made whether there is another symbolic state in the worklist. If there are no more symbolic states in the worklist, processing is complete and proceeds to a return block that proceeds back to FIG. 4. When processing is complete, if the symbolic store does not contain any symbolic state with an $error state in the abstract state, the results indicate that the program satisfied the property being tested. Thus, the program is ready for the next phase of testing. However, as long as there is another symbolic state in the worklist, processing continues at block 504.

At block 504, a symbolic state S is retrieved from the worklist. When the abstract program is first entered, typically, the worklist contains one symbolic state that specifies the default state defined in the property information. However, after processing several branch statements, the worklist may contain several symbolic states. Processing continues at block 506.

At block 506, the symbolic state S is removed from the worklist, because symbolic state S has been selected for processing. Thus, the worklist maintains a list of interim symbolic states that have not yet been selected for processing. Processing continues at block 508.

At block 508, a statement N is retrieved. The statement N is the statement that follows the edge associated with symbolic state S. For the following discussion, a statement is a node in the CFG. Nodes are produced for assignment statements, branch conditions, function calls, join points, return statements, and the like. The nodes are produced in a standard manner that is well known in the art. A compound statement in the original program is broken into individual statements in the abstract program for processing by the verification tool. Processing continues to decision block 510.

At decision block 510, a determination is made whether the statement N is a branch statement. If statement N is not a branch statement, processing continues to decision block 512. At decision block 512, a determination is made whether statement N affects the abstract state or the concrete state of the symbolic state being processed. As mentioned above, the abstract state is associated with the current state of the property being tested. The concrete state is associated with other aspects of the computation performed by the program, such as the values of program variables. If the statement affects the symbolic state, processing continues to block 514 where a new symbolic state (i.e., symbolic state S''') is created that contains symbolic state S with updated information. From block 514, processing continues to block 518.

Returning back to decision block 512, if statement N does not affect the symbolic state S, processing proceeds to block 516. At block 516, a copy of symbolic state S is created (i.e., symbolic state S''').

At block 518, the add heuristic of the present invention is applied to the symbolic state S''' on the outgoing edge from statement N. The add heuristic (i.e., add process 600), described in detail below, is one of the reasons that the present invention achieves accurate analysis and achieves this accurate analysis even for large software programs, not just for small software programs. In general, the add process utilizes the abstract state and the concrete state to determine which symbolic states should be merged and to determine which symbolic states are copied into the symbolic store. This add process is sensitive to the states defined in the finite state machine for the property being tested. By basing this determination upon the states defined in the finite state machine, the present invention provides accurate results without experiencing an exponential blowup in the search space. The add process is described in detail below in conjunction with FIG. 6. Processing then loops back to decision block 502 for another symbolic state, if available.

Now, returning to decision block 510, if statement N is a branch statement, processing continues to block 520. At block 520, copies of the symbolic state (e.g., copies S'and S") are created for each path that may be traversed. Each path then updates its copy of the symbolic state as needed. Processing continues at decision block 522.

At decision block 522, a determination is made whether one of the edges (e.g., "false" edge) for statement N is relevant. This determination is based on the concrete state of symbolic state S. For example, if the symbolic state S contained "Flag=True" and the condition for the branch statement was "if flag", the "T" edge of statement N would be relevant, but the "F" edge of statement N would not be relevant. When the edge is relevant, processing continues at block 524.

At block 524, the concrete state of the copied symbolic state S' is updated to reflect the knowledge that the branch condition is false. Because the process is proceeding down the false path of the branch statement, this knowledge is added to symbolic state S'. Processing continues at block 526.

The add heuristic at block 526 is similar to processing described above for block 518. However, the copy of the symbolic state S' is added to the outgoing "False" edge from statement N. The add process is described in detail below in conjunction with FIG. 6. Processing continues at decision block 528, as does the processing if decision block 522 concludes that the "False" edge is not relevant.

At decision block 528, a determination is made whether another edge (e.g., "True" edge) for statement N is relevant. Again, this determination is based on the concrete state of the current copy of symbolic state S (symbolic state S"). If the edge is relevant, processing continues at block 530.

At block 530, the concrete state of the copied symbolic state S" is updated to reflect the knowledge that the branch condition is true. This knowledge is added to symbolic state S" because the process is proceeding down the true path of the branch statement. Processing continues at block 532.

The add heuristic performed at block 532 is similar to processing described above for blocks 518 and 526. However, the copy of the symbolic state S" is added to the outgoing edge (e.g., "true" edge) from statement N. Again, the add process is described in detail below in conjunction with FIG. 6. Processing then loops back to decision block 502 for another symbolic state, if available.

Figure 6:
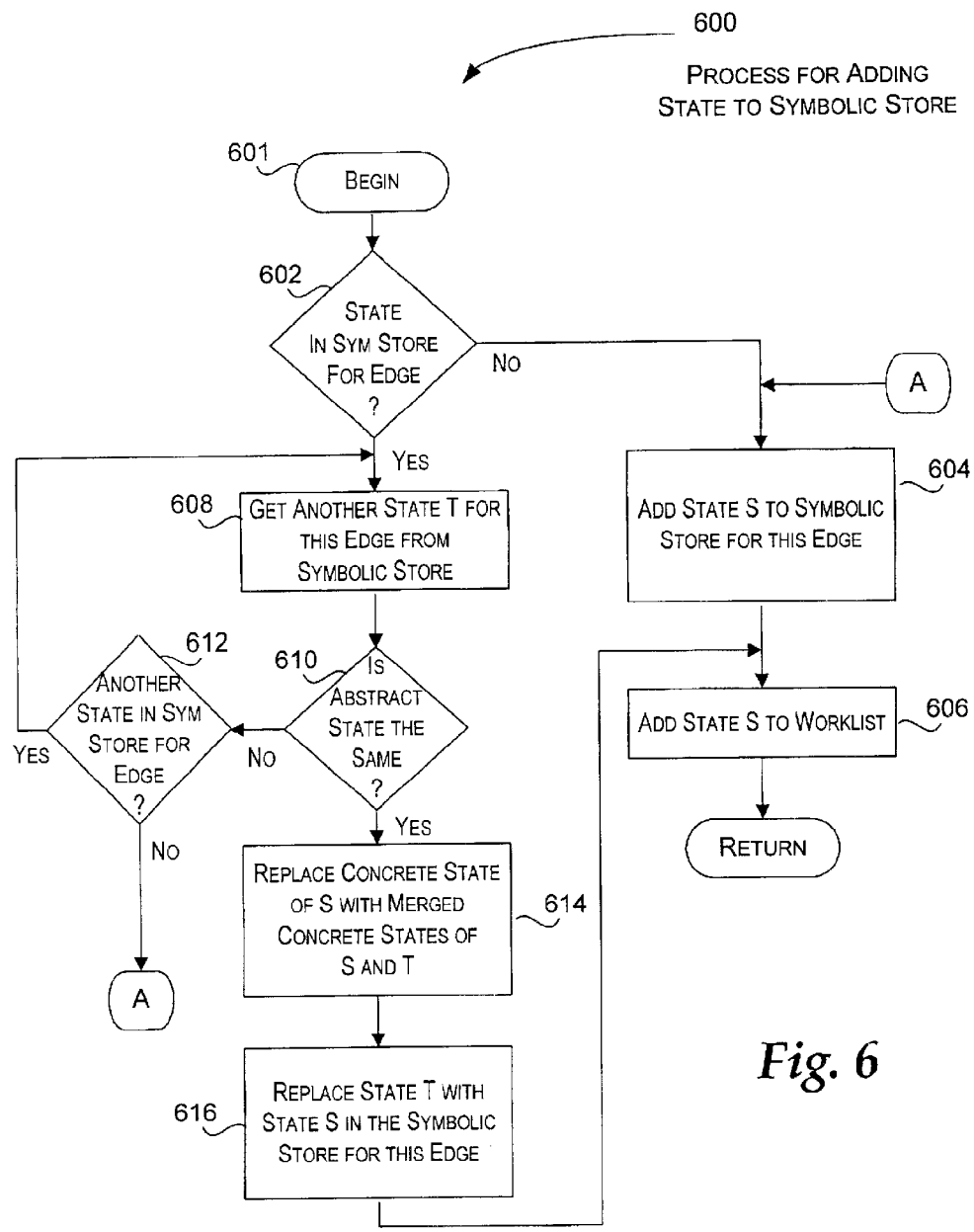
FIG. 6 is a logical flow diagram illustrating a process for adding symbolic states to the symbolic store for use in the tracking process illustrated in FIG. 5.

While FIG. 5 illustrates a process 500 in which the decisional statement is a branch statement, other decisional statements may be used without departing from the present invention. If these other decisional statements have more than two paths, additional copies of the symbolic store (block 520) are created and additional blocks similar to blocks 522–526 are added for each additional path. Each outgoing edge from a multi-way branch updates the symbolic state according to the condition under which program execution follows that branch. The add heuristic is now described in detail. FIG. 6 is a logical flow diagram illustrating a process for adding symbolic states to the symbolic store. The process enters at starting block 601, after a symbolic state has been processed. Processing continues at decision block 602.

At decision block 602, a determination is made whether another symbolic state exists in the symbolic store for this particular edge. As mentioned above, the symbolic store may contain several symbolic states. Because branch statements sometimes cause two differing symbolic states to be stored in the symbolic store, one edge may have several symbolic states associated with it. The present invention attempts to merge these symbolic states whenever possible. Therefore, if any symbolic state exists in the symbolic store for the edge associated with statement N, processing continues at block 608. If no symbolic state exists in the symbolic store for the edge associated with statement N, symbolic state S is added to the symbolic store and to the worklist, at blocks 604 and 606, respectively.

At block 608, another symbolic state T for this edge is retrieved from the symbolic store. At decision block 610, a determination is made whether the abstract state for symbolic states S and T are the same. If the abstract states are different, this indicates that the property being tested is in different states in the two symbolic states. Therefore, the present invention does not merge the symbolic states. In this case, processing continues to decision block 612.

At decision block 612, a determination is made whether there is another symbolic state in the symbolic store for this edge. If there is, the process loops back to block 608 and proceeds as described above. However, if there is not another symbolic state for this edge, processing continues at block 604 where the symbolic state S is added to the symbolic store for this edge. The symbolic state S is added because it represents a symbolic state with a new abstract state. This occurs whenever the "NO" branch from block 612 is reached. By reaching the "NO" branch, the process determines that the symbolic store does not currently contain any symbolic state with the same abstract state as that of symbolic state S. In accordance with the present invention, the symbolic store will contain, at the most, one symbolic state for each abstract state possible at each edge. Whenever there are two symbolic states with the same abstract state at one edge, the present invention merges the two symbolic states into a merged symbolic state. The process then proceeds to block 606 where symbolic state S is added to the worklist. By adding the symbolic state to the worklist, the process ensures that symbolic state S will be carried forward in processing the remaining paths in the abstract program.

Referring back to decision block 610, if the abstract state is the same, processing proceeds to block 614. At block 614, the contents of the concrete state in symbolic state S and symbolic state T are merged. In one embodiment, the merge is performed by deleting any information in the concrete state that is different between symbolic states S and T. Symbolic state S is updated with this merged concrete state. In addition, at block 616, symbolic state T in the symbolic store is replaced with the newly merged symbolic state S for this edge, thereby reducing the number of symbolic states in the symbolic store.

This merging of information and replacement of symbolic states in the symbolic store results in some information being lost. Thus, the precision of the path-sensitive verification process is decreased. However, the inventors of the present invention have recognized that as long as the relevant branching behavior is maintained, the accuracy of the present invention is not appreciably reduced in comparison to the traditional very precise path-sensitive verification analysis. This heuristic avoids exponential explosion of the search space while still capturing the relevant branching behavior. Therefore, software programs with large code bases may be analyzed with the present invention. Processing continues to block 606.

As described above, at block 606, the symbolic state S is added to the worklist. This "merged" symbolic state then becomes one of the symbolic states in the worklist and is used in further processing. One will note that the effect of the merging at block 614 is that for any edge, there will be only one symbolic state in the symbolic store per property state. Therefore, the number of symbolic states in the symbolic store will not grow exponentially due to branches in the program. Processing then continues to return block and is complete.

Now, the flow of process 500 and process 600 will be described in conjunction with the control flow graphs shown in FIGS. 7–11. Briefly, the control flow graphs shown in FIGS. 7–11 are identical and visually represent the abstract program created from the source code shown in Table 1.

TABLE 1

```
void main( ) {
    x = 0;
    if (flag)
        f = fopen(...);
    if (p)
        x++;
    if (flag)
        fclose (f);
}.
```

Control flow graph 700 includes twelve nodes N0–N11. Each node is associated with one of the statements in the source code shown in Table 1. In essence, control flow graph 700 provides a visual representation of the abstract program created in block 404 of FIG. 4. As shown in Table 1, the program includes one function named main( ) and does not include any function calls or returns. Thus, the following discussion of the example source code describes the intraprocedural aspect of the process for tracking the concrete and abstract state. The join points associated with each branch statement (e.g., nodes N4, N7, and N10) are explicitly identified in the CFG.

Figure 7:
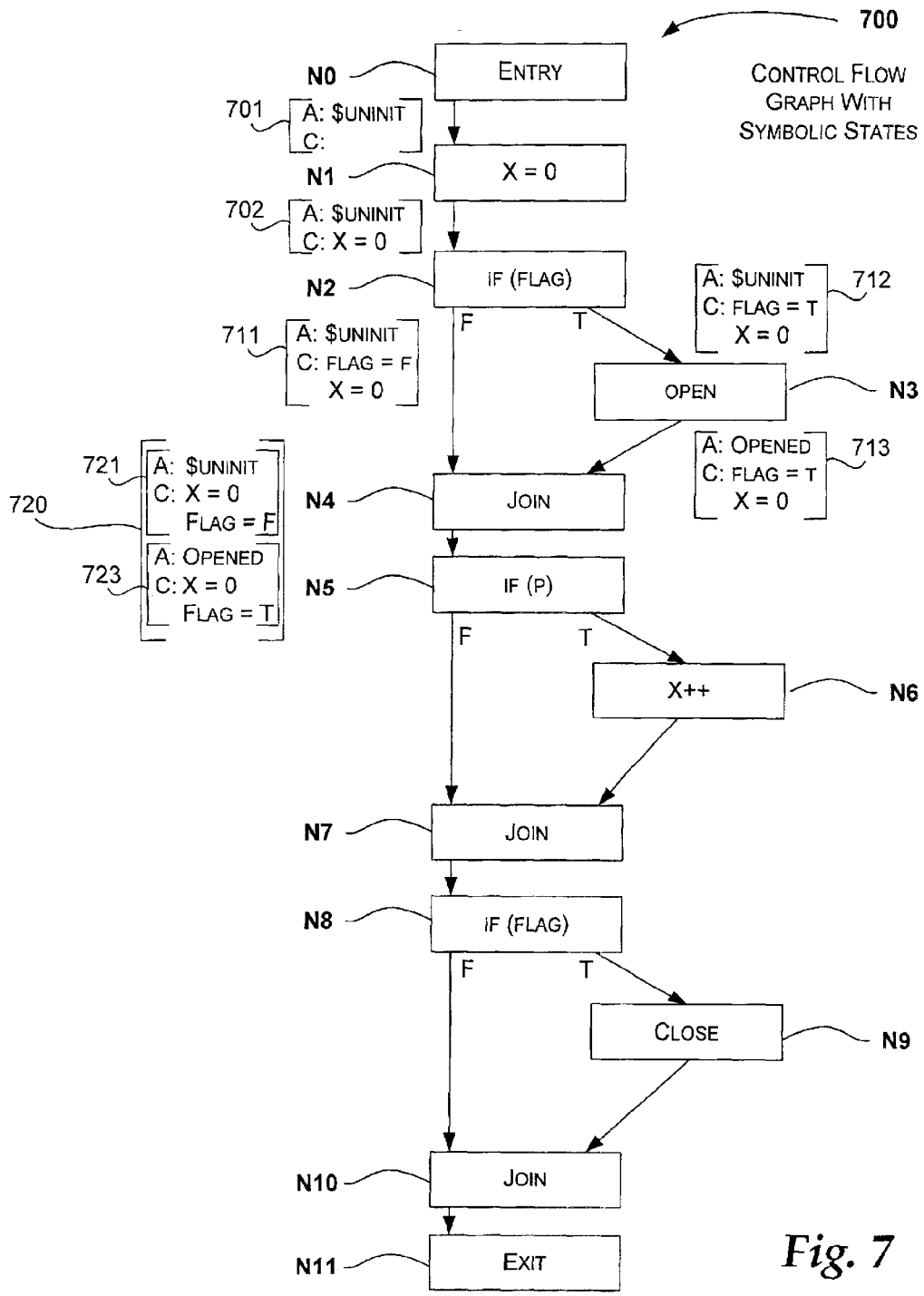
FIGS. 7–11 are a series of control flow graphs that represent the logic of an exemplary software program and illustrate the symbolic states at various points along the control flow graph during the path-sensitive verification process performed in accordance with the present invention.

The process enters the main( ) program (starting block 501) represented by node N0 in FIG. 7. At this node, the symbolic store and the worklist both contain one symbolic state (e.g., symbolic state 701), which includes the initial state (i.e., $uninit) associated with the property being tested. As described above, the initial state is defined in the property information (see FIG. 3). Thus, the symbolic state 701 is shown having the abstract state of $uninit and having an empty concrete state. The process 500 continues at block 502.

At block 502, a determination is made whether there is a symbolic state in the worklist. As stated above, there is currently one symbolic state (e.g., symbolic state 701). Therefore, symbolic state 701 is retrieved from the worklist (block 504) and removed from the worklist (block 506). At this point, the worklist does not contain any symbolic states. Processing continues to block 508.

At block 508, a statement is retrieved that follows the symbolic state 701 (i.e., "x=0" at node N1 in FIG. 7). This statement is not a branch (decision block 510), but does affect the symbolic state 701 (decision block 512). Thus, the symbolic state 701 is updated to reflect the affect of the statement. For this example, "x=0" is added to the concrete state which results in symbolic state 702 on this edge. Symbolic state 702 is then added to the symbolic store in accordance with FIG. 6. Because there is not any other symbolic state in the symbolic store for this edge (decision block 602), symbolic state 702 is added to the symbolic store (block 604) and is added to the worklist (block 606). Processing returns to FIG. 5 to process another symbolic state in the worklist.

At this point, there is just the one symbolic state (i.e., symbolic state 702) in the worklist. Thus, symbolic state 702 is retrieved (block 504) and removed (block 506) from the worklist. The statement "if (flag)" at node N2 is retrieved. Because this statement is a branch (decision block 510), two copies (not shown) of symbolic state 702 are created (block 520).

The symbolic state 702 does not rule out proceeding through the "false" path (decision block 522). Therefore, the "false" edge of the "if(flag)" statement is relevant for symbolic state 702. The first copy of the symbolic state 711 is updated with the predicate of the branch statement (i.e., "x=0") (block 524). Because there are not any other symbolic states associated with the "false" edge (decision block 602), symbolic state 711 is added to the symbolic store (block 604) and added to the worklist (606).

Likewise, the symbolic state 702 does not rule out proceeding through the "true" path (decision block 522). Therefore, the "true" edge of the "if(flag)" statement is relevant for symbolic state 702. The second copy of the symbolic state 712 is updated with the predicate of the branch statement (i.e., "x=0") (block 530). Again, because there are not any other symbolic states associated with "true" edge (decision block 602), symbolic state 712 is added to the symbolic store (block 604) and added to the worklist (606). At this time, the symbolic store contains symbolic states 701, 702, 711, and 712. The worklist contains symbolic states 711 and 712.

Returning to decision block 502, either one of these symbolic states may be retrieved. Assume that symbolic state 712 is retrieved (block 504) and removed (block 506) from the worklist. The "open" statement at node N3 is retrieved (block 508). The "open" statement is not a branch (decision block 510), but does affect the symbolic state of 712. Therefore, symbolic state 712 is updated (block 514), resulting in symbolic state 713. As symbolic state 713 illustrates, N3 affects the abstract state of symbolic state 712. The abstract state in symbolic state 712 is $uninit. According to the property information, an OPEN transition from state $uninit results in state Opened. Therefore, the abstract state is updated to Opened in symbolic state 713. Again, there are not any other symbolic states in the symbolic store for this edge. Thus, symbolic state 713 is added to the symbolic store (block 604) and added to the worklist (block 606). At this time, the symbolic store contains symbolic states 701, 702, 711, 712, and 713. The worklist contains symbolic states 711 and 713.

Returning to decision block 502, either one of these symbolic states may be retrieved. Assume that symbolic state 711 is retrieved (block 504) and removed (block 506). The join statement at node N4 is then retrieved (block 508). Because the join statement is not a branch statement (decision block 510) and does not affect the symbolic state 711, processing proceeds to decision block 602 in FIG. 6. Because there is not any symbolic state in the symbolic store for the outgoing edge from join statement (decision block 602), symbolic state 711 is added to the symbolic store for this edge (block 604) and also added to the worklist (block 606) as symbolic state 721.

Returning to decision block 502, there is another symbolic state (symbolic state 713) in the worklist. Symbolic state 713 is retrieved (block 508) and removed (block 506). The join statement at node N4 is retrieved (block 508). Because the join statement is not a branch statement (decision block 510) and does not affect the symbolic state 713, processing proceeds to decision block 602 in FIG. 6. However, this time there is a symbolic state in the symbolic store for the join state at node N4 (i.e., symbolic state 721). Thus, symbolic state 721 is retrieved (block 608). Because the abstract states are different (decision block 610) and there is not another symbolic state in the symbolic store for this edge (decision block 612), symbolic state 713 is added to the symbolic store (block 604) and to the worklist 720 (block 606) as symbolic state 723. Thus, at this point, the symbolic store contains symbolic states 701, 702, 711, 712, 713, 721, and 723. The worklist contains symbolic states 721 and 723.

One will note that the processing of each symbolic state at each node may proceed independently. The add heuristic will properly update the symbolic store at the appropriate time. Therefore, in this embodiment, the process does not have to completely finish both paths of a branch statement before continuing with the join statement and before processing other statements.

Figure 8:
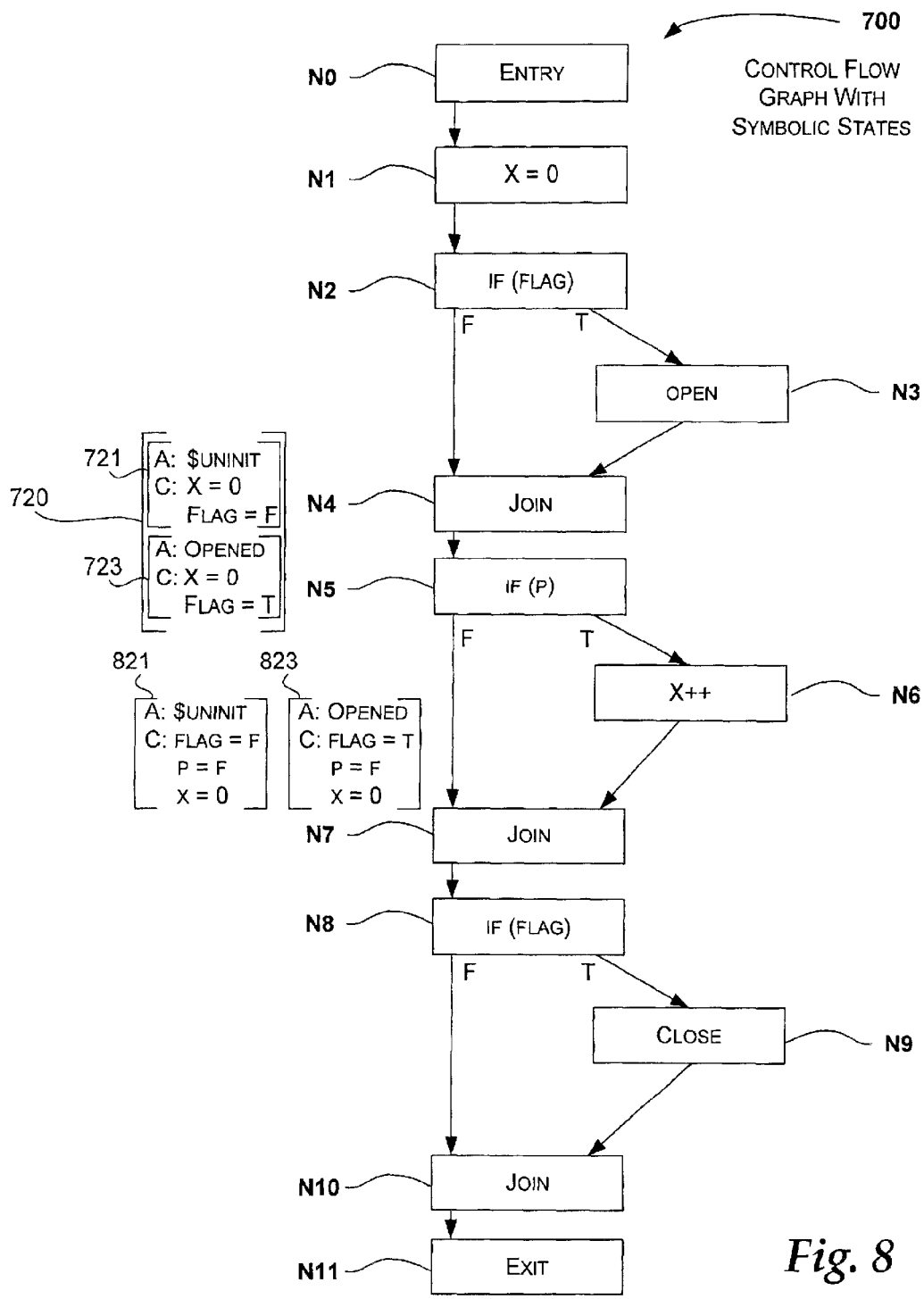
Figure 9:
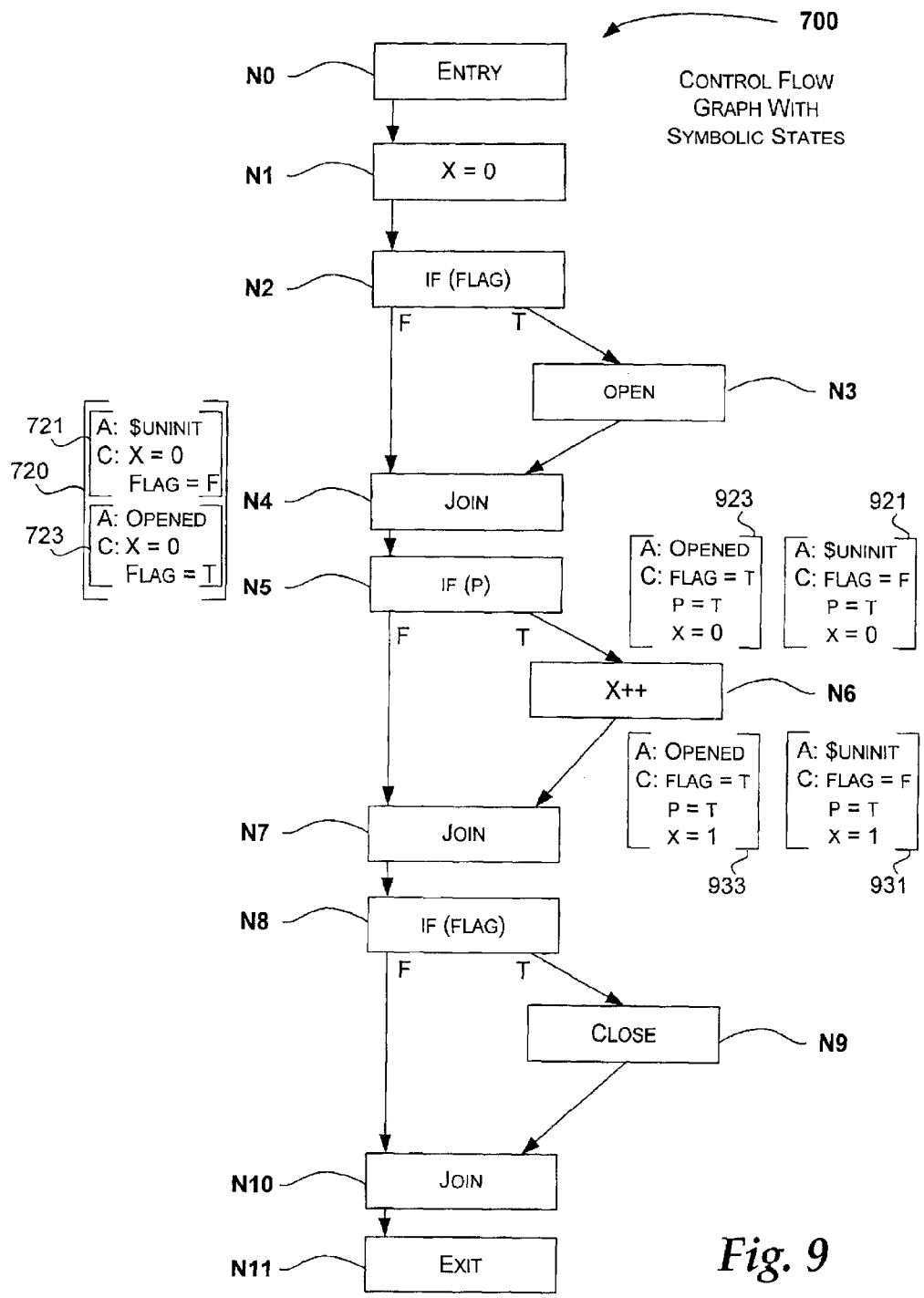
Figure 10:
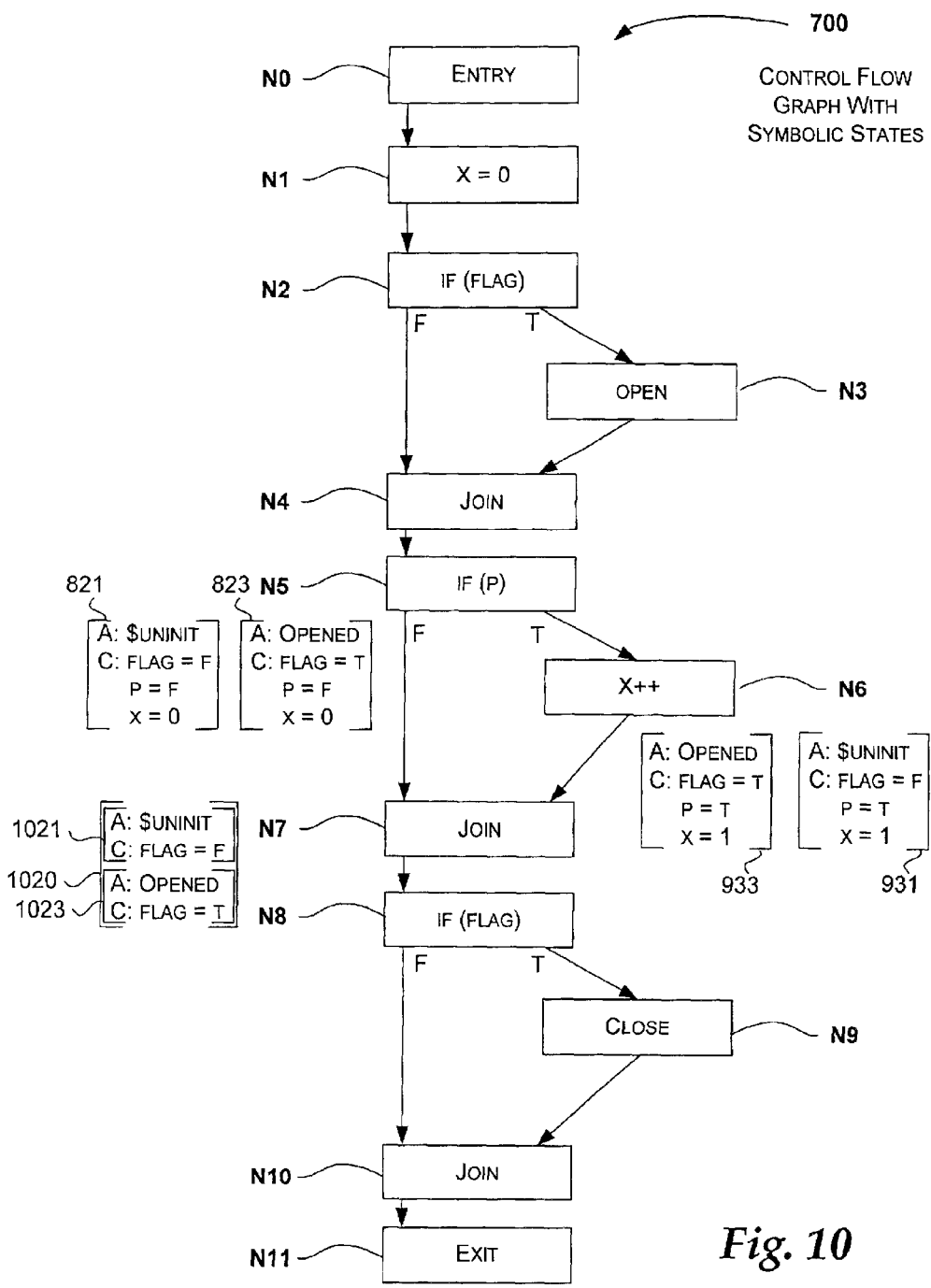
Figure 11:
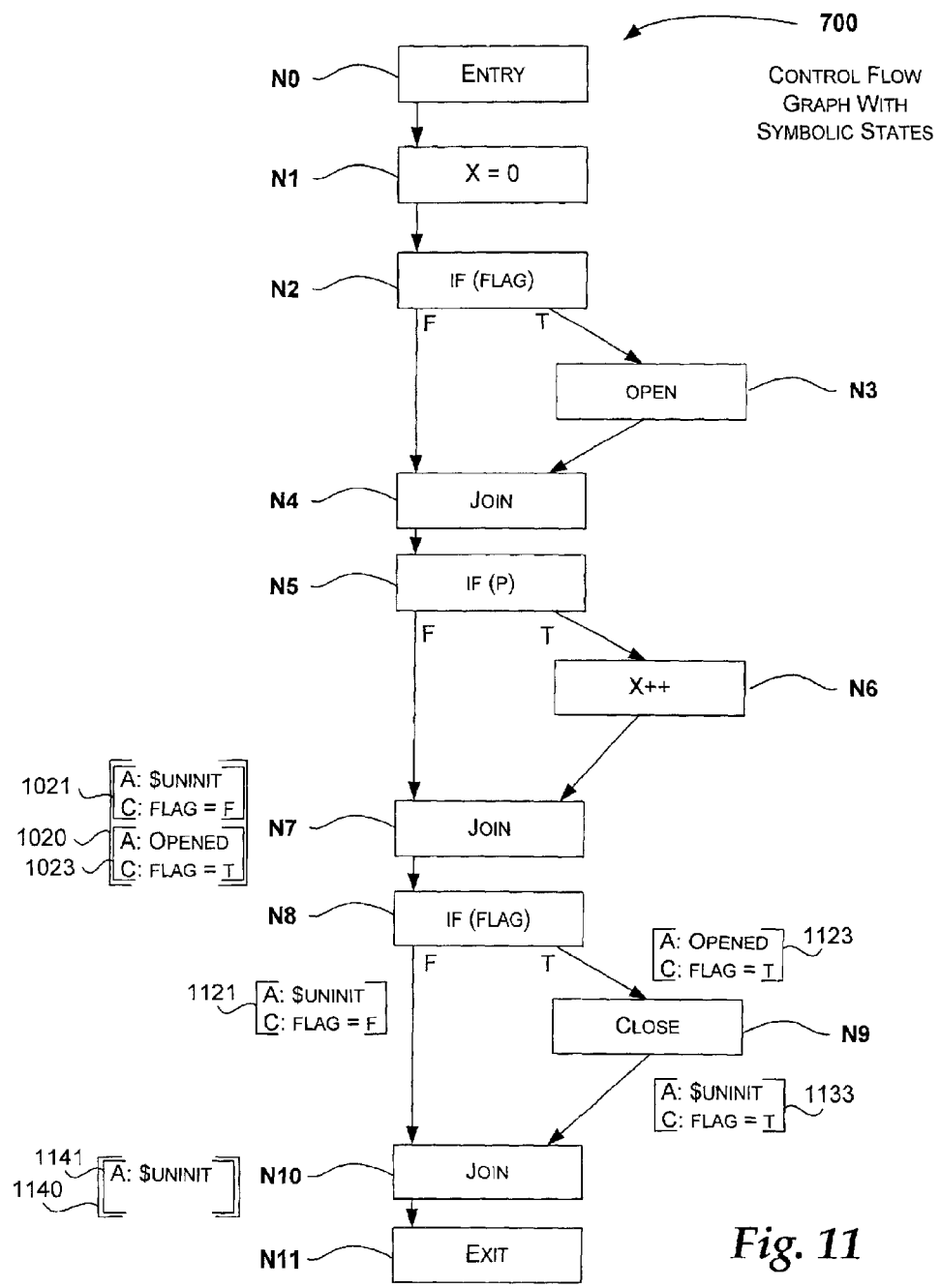

The symbolic states 721 and 723 that are in the worklist are then processed through process 500 and 600 and the newly created symbolic states are added to the worklist. The newly created symbolic states are also processed through process 500 and 600. FIGS. 8–11 illustrate the symbolic states that occur at each node. Without being unnecessarily duplicative, the following discussion only describes the impact of the add heuristic at the join points N4, N7, and N10 and does not walk through the processing of each symbolic state and the generation of each additional symbolic state. One skilled the art can easily expand on the foregoing example illustrated in FIG. 7 and described above to create the symbolic states shown in FIGS. 8–11. Thus, FIGS. 8–10 illustrates the worklist 720 at node N4, the intermediary symbolic states, and the worklist 1020 at node N7. FIG. 11 illustrates the worklist 1020 at node N7, the intermediary symbolic states, and the worklist 1140 at node N10.

Referring to FIGS. 8–10, at the join point at node N4, the work list 720 includes symbolic states 721 and 723. The symbolic store contains symbolic states 701, 702, 711, 712, 713, 721, and 723. Right before Node N7, the symbolic store contains symbolic states 701, 702, 711, 712, 713, 721, 723, 821, 823, 921, 923, 931, and 933. The worklist contains symbolic states 821, 823, 931, and 933.

Assuming symbolic state 821 is being processed at the join statement, there is not any symbolic state in the symbolic store for the join state (i.e., outgoing edge from join statement node N7) (decision block 602). Therefore, symbolic state 821 is added to the symbolic store for this edge (block 604) and also added to the worklist (block 606). Returning to decision block 502, there is another symbolic state (symbolic state 823) in the worklist. Symbolic state 823 is retrieved (block 508) and removed (block 506). The join statement at node N7 is retrieved (block 508). Because the join statement is not a branch statement (decision block 510) and does not affect the symbolic state 823, processing proceeds to decision block 602 in FIG. 6. However, this time there is a symbolic state in the symbolic store for the join state at node N7 (i.e., symbolic state 821). Thus, symbolic state 821 is retrieved. However, the abstract states are not the same (decision block 610). Therefore, symbolic state 823 is added to the symbolic store for this edge (block 604) and also added to the worklist (block 606).

When symbolic state 933 is processed, merging of the symbolic states occurs with symbolic state 823 because these symbolic states are on the same edge (decision block 602) and have the same abstract state. The merging of symbolic states 823 and 933 results in symbolic state 1023, which is added to worklist 1020 (block 606). Symbolic states 823 and 933 are effectively removed from the symbolic store (block 614 and block 616). Again, this illustrates how the present invention prevents search space explosion. Symbolic states 821 and 931 are likewise merged into symbolic state 1021 in worklist 1020. As one will note, information regarding the variables P and X are deleted during this merging process. However, even though there is a loss of information, because neither of these variables affected the abstract state, the accuracy of the present invention is not sufficiently impacted.

Referring to FIG. 11, at the join point at node N7, the work list 1020 includes symbolic states 1021 and 1023. The symbolic store contains symbolic states 701, 702, 711, 712, 713, 721, 723, 821, 823, 921, 923, 931, 933, 1021, and 1023. FIG. 11 illustrates how the present invention utilizes the concrete state to determine which edges are relevant for a given symbolic state (see decision blocks 522 and 528). Thus, as shown, even though there are two symbolic states before the branch (node N8), only one symbolic state is generated for each node in the two independent branch paths. Therefore, at join point N10, there are only two symbolic states (symbolic states 1121 and 1133) in the worklist which are combined using process 600 to produce symbolic state 1141. Once symbolic state 1141 is processed and removed from worklist 1140, the worklist contains no more symbolic states. Thus, the process 500 of tracking concrete and abstract states is then complete for the example abstract program. The $error state did not occur during the verification process, which means that there were no errors identified in the print-to-file example source code.

As one skilled in the art will appreciate, the present invention also operates with nested decisional statements or loop constructs. The inner nests, along with their symbolic stores, are processed before proceeding with any outer nests. In addition, for the above discussion, the intraprocedural aspect of the present invention is described in detail. The present invention also operates in an interprocedural manner. For programs with multiple procedures and calls between procedures, the present invention produces a combined CFG by combining the CFGs of individual procedures, in a manner that is well known in the art. For example, edges are added that connect a call site with the entry point of the called function, and that connect the exit point of the called function with a corresponding return node for the call site. Processing is as in the intraprocedural case, except that symbolic states are not merged at the exit points of functions. Instead, the information at exit points is stored as a mapping from a symbolic state at the entry point to the resulting symbolic state at the exit point.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for performing path-sensitive verification on a software program, the method comprising:
traversing a logic path in the software program, the logic path having a plurality of nodes, each of the plurality of nodes having at least one edge associated therewith, the at least one edge linking a first node and a second node out of the plurality of nodes;
maintaining a symbolic store associated with a property being tested, the symbolic store including a plurality of symbolic states, each symbolic state having an abstract state and a concrete state, the abstract state identifying a current property state out of a plurality of property states for the property being tested and the concrete state identifying current information associated with other properties in the software program, each symbolic state being associated with one edge;
traversing a current path in the logic path using a current symbolic state out of the plurality of symbolic states, the current path including a current node out of the plurality of nodes and a current edge that is associated with the current node; and
updating the symbolic store to reflect changes in the abstract state and in the concrete state based on the current path,
wherein the symbolic store is updated in a manner such that no two symbolic states associated with the current edge have identical abstract states.

2. The method of claim 1, wherein the current node includes a decisional statement that branches into two or more decisional paths in the logic path, the current path including the decisional statement and a corresponding edge associated with one of the decisional paths, the corresponding edge being the current edge.

3. The method of claim 2, wherein the decisional statement includes an if statement and the corresponding edge includes a true branch.

4. The method of claim 1, further comprising determining whether to traverse the current path based on the concrete state in the current symbolic state being processed.

5. The method of claim 1, wherein updating the symbolic store includes modifying the abstract state of the current symbolic state if the property being tested undergoes a transition at the current node.

6. The method of claim 1, wherein updating the symbolic state includes adding a variable and an associated value to the concrete state of the current symbolic state.

7. The method of claim 6, further comprising determining whether to traverse the current path based on the variable and the associate value.

8. The method of claim 1, wherein the software program is an abstraction of the software program.

9. The method of claim 1, wherein the current node includes one of a conditional statement, an assignment statement, a join point, a function call, and a return statement.

10. The method of claim 1, wherein updating the symbolic store comprises:
    storing the current symbolic state in the symbolic store if none of the plurality of symbolic states in the symbolic store is associated with the current edge;
    storing the current symbolic state in the symbolic store if a stored symbolic state out of the plurality of symbolic states in the symbolic store is associated with the current edge and the abstract state of the stored symbolic state is different than the abstract state of the current symbolic state; and
    replacing the stored symbolic state with a merged symbolic state if the abstract state of the stored symbolic state and the abstract state of the current symbolic state are identical, the merged symbolic state being created by merging the concrete state of the current symbolic state and the concrete state of the stored symbolic state.

11. The method of claim 10, wherein merging includes saving a portion of the concrete state of the current symbolic state, the portion having identical content as in the concrete state of the stored symbolic state.

12. A computer-readable medium having computer-executable components, comprising:
    a first component for analyzing a representative program of the software program, the first component is configured to traverse a logic path in the representative program, the logic path having a plurality of nodes, each of the plurality of nodes having at least one edge associated therewith, the at least one edge linking a first node and a second node out of the plurality of nodes; and
    a second component for maintaining a symbolic store based on the analysis of the representative program by the first component, the symbolic store being associated with a property being tested, the symbolic store including a plurality of symbolic states, each symbolic state having an abstract state and a concrete state, the abstract state identifying a current property state out of a plurality of property states for the property being tested and the concrete state identifying current information associated with other properties in the software program, each symbolic state being associated with one edge;
    wherein the first component is configured to traverse a current path in the logic path using a current symbolic state out of the plurality of symbolic states, the current path including a current node out of the plurality of nodes and a current edge that is associated with the current node and the second component is configured to update the symbolic store to reflect changes in the abstract state and in the concrete state based on the current path in a manner such that no two symbolic states associated with the current edge have identical abstract states.

13. The computer-readable medium of claim 12, further comprising a third component configured to create the representative program.

14. The computer-readable medium of claim 12, further comprising a fourth component configured to output results from the analysis, the results indicating a success if none of the plurality of symbolic states in the symbolic store have an abstract state indicating an error state out of the plurality of property states for the property being tested.

15. The computer-readable medium of claim 12, wherein the first component determines whether to traverse the current path based on the concrete state in the current symbolic state being processed.

16. The computer-readable medium of claim 12, wherein the second component updates the symbolic store by modifying the abstract state of the current symbolic state if the property being tested undergoes a transition at the current node.

17. The computer-readable medium of claim 12, wherein the second component updates the symbolic state by adding a variable and an associated value to the concrete state of the current symbolic state.

18. The computer-readable medium of claim 17, wherein the second component determines whether to traverse the current path based on the variable and the associate value.

19. The computer-readable medium of claim 12, wherein the second component updates the symbolic store by performing the following steps:
    storing the current symbolic state in the symbolic store if none of the plurality of symbolic states in the symbolic store is associated with the current edge;
    storing the current symbolic state in the symbolic store if a stored symbolic state out of the plurality of symbolic states in the symbolic store is associated with the current edge and the abstract state of the stored symbolic state is different than the abstract state of the current symbolic state; and
    replacing the stored symbolic state with a merged symbolic state if the abstract state of the stored symbolic state and the abstract state of the current symbolic state are identical, the merged symbolic state being created by merging the concrete state of the current symbolic state and the concrete state of the stored symbolic state.

20. The computer-readable medium of claim 19, wherein merging includes saving a portion of the concrete state of the current symbolic state, the portion having identical content as in the concrete state of the stored symbolic state.

21. A system for performing a path-sensitive analysis on a software program, comprising:
    a processor;
    a memory into which a plurality of instructions are loaded, the plurality of instructions performing a method comprising:
    traversing a logic path in the software program, the logic path having a plurality of nodes, each of the plurality of nodes having at least one edge associated therewith, the at least one edge linking a first node and a second node out of the plurality of nodes;
    maintaining a symbolic store associated with a property being tested, the symbolic store including a plurality of symbolic states, each symbolic state having an abstract state and a concrete state, the abstract state identifying a current property state out of a plurality of property states for the property being tested and the concrete state identifying current information associated with other properties in the software program, each symbolic state being associated with one edge;
    traversing a current path in the logic path using a current symbolic state out of the plurality of symbolic states, the current path including a current node out of the plurality of nodes and a current edge that is associated with the current node; and updating the symbolic store to reflect changes in the abstract state and in the concrete state based on the current path, wherein the symbolic store is updated in a manner such that no two symbolic states associated with the current edge have identical abstract states.

22. The system of claim 21, wherein updating the symbolic store comprises:

storing the current symbolic state in the symbolic store if none of the plurality of symbolic states in the symbolic store is associated with the current edge;

storing the current symbolic state in the symbolic store if a stored symbolic state out of the plurality of symbolic states in the symbolic store is associated with the current edge and the abstract state of the stored symbolic state is different than the abstract state of the current symbolic state; and replacing the stored symbolic state with a merged symbolic state if the abstract state of the stored symbolic state and the abstract state of the current symbolic state are identical, the merged symbolic state being created by merging the concrete state of the current symbolic state and the concrete state of the stored symbolic state.

23. The system of claim 21, wherein merging includes saving a portion of the concrete state of the current symbolic state, the portion having identical content as in the concrete state of the stored symbolic state.

* * * * *